(No Model.)
R. S. MERRILL.
HEATING ATTACHMENT FOR ARGAND LAMPS, &c.
No. 469,161. Patented Feb. 16, 1892.
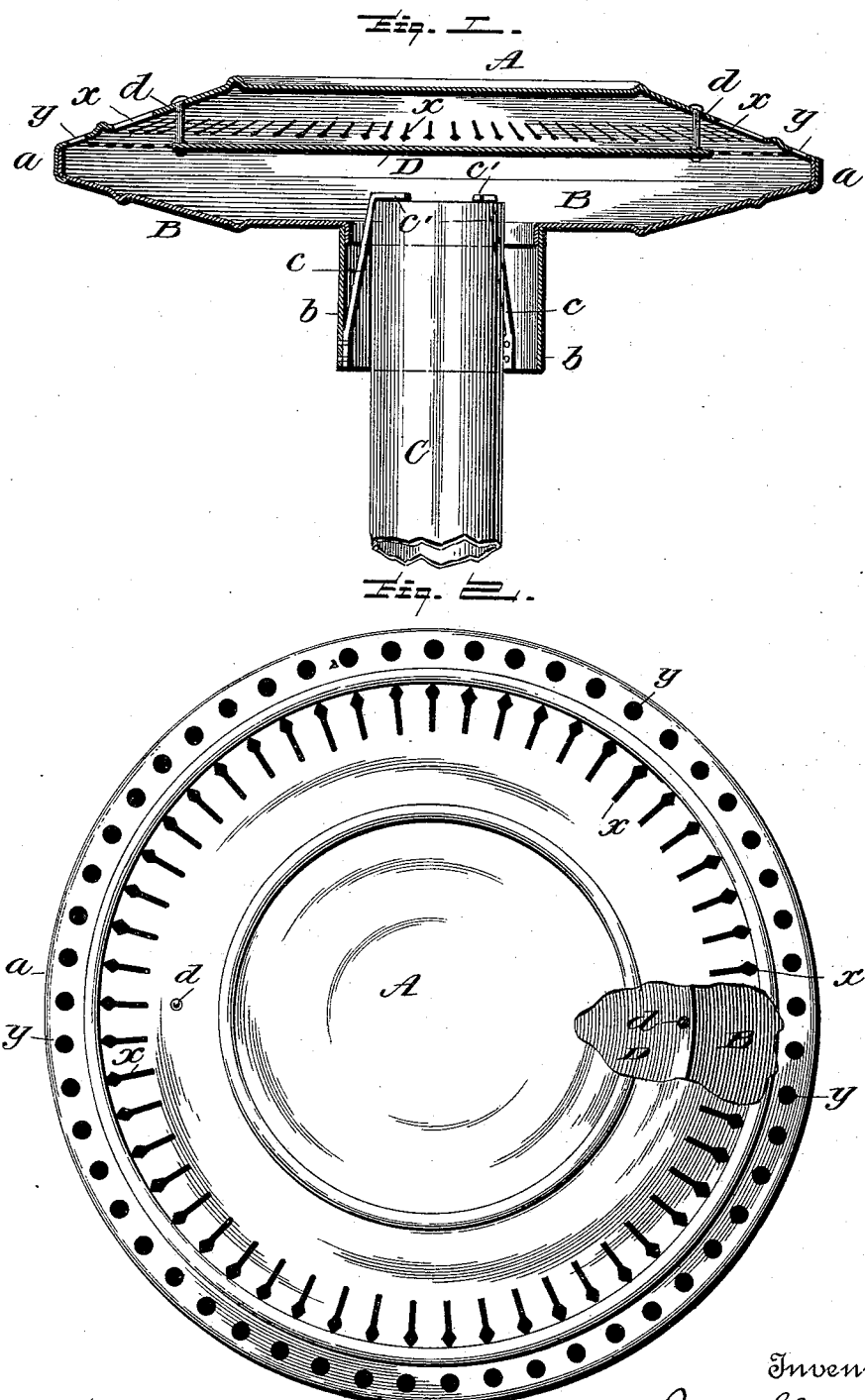

UNITED STATES PATENT OFFICE.

RUFUS S. MERRILL, OF BOSTON, MASSACHUSETTS, ASSIGNOR OF ONE-HALF TO ADDISON A. REEVE, OF SAME PLACE.

HEATING ATTACHMENT FOR ARGAND LAMPS, &c.

SPECIFICATION forming part of Letters Patent No. 469,161, dated February 16, 1892.

Application filed October 29, 1891. Serial No. 410,217. (No model.)

*To all whom it may concern:*

Be it known that I, RUFUS S. MERRILL, of Boston, in the State of Massachusetts, have invented a new and useful Heating Attachment for Argand and other Lamp or Gas Burners, of which the following is a specification.

It is my object to provide a device for utilizing for heating purposes the heat emitted by burners of the kind known as "Rochester burners" and other burners of the Argand type, this device to be one that can be applied to the burner at will without requiring any alteration in the latter and without interfering with its usefulness as a light-giving agent. The device which I have devised for this purpose is a broad shallow sheet-metal heating-chamber, the bottom of which is imperforate, save at the center, where it has a socket to receive the chimney, provided with holding tines or projections to catch over or rest upon the top of the chimney, and the top of which is pierced at or near its rim with small holes, in number and size sufficient to permit the passage of the heated air with such freedom as not to interfere with the draft of the burner. The heated air from the chimney strikes against the imperforate central portion of the top and is thence deflected outwardly toward the rim of the heater, where it escapes through, in divided condition, the many small holes therein, heating the surrounding air and acting under these conditions as a very efficient agent, sufficient to heat small rooms—such, for example, as sewing-rooms or bath-rooms—in a very thorough manner.

The device is light and is not at all unpleasing to the eye, it can be readily fitted to and removed from the chimney of any burner, and requires no alteration in existing burners or chimneys.

The acccompanying drawings represent my device in the best form at present known to me.

Figure 1 is a vertical central section of the same as it appears on a lamp-chimney, the upper part of which latter is represented in the figure. Fig. 2 is a plan view of the device.

The device is composed of the two shallow dished disks A B, of sheet metal, united at their peripheries by a vertical band $a$, which in this instance is formed in one with the upper sheet-metal disk A. In this way a shallowed sheet-metal drum is formed. The lower disk B is imperforate, save at the center, where an opening is formed in it for the chimney, this opening being surrounded by an external sheet-metal collar $b$, of sufficient size to receive loosely the top of any ordinary lamp-chimney C. Within and fixed to the collar are spring inwardly-bent wires $c$, capable of being sprung apart to receive the chimney between them and to clasp it sufficiently closely to hold the heating appliance steady on the chimney. They are provided at their inner upper ends with hooks $c'$ or the like to catch over or rest upon the top of the chimney. There may be three or more of these holding devices $c$. The top disk A is imperforate, except near its rim, where it is provided with numerous small slits or holes $x$ $y$ for passage of the heated air.

In order to protect the central portion of disk A from being injuriously affected by the excessive heat discharged from the lamp-chimney, I prefer to interpose between it and the chimney a thin deflecting-shield D, secured to the top A by legs or supports $d$.

When it is desired to use this device with a lighted lamp, all that is required is to put it on the chimney in the position shown. The heated air discharged from the chimney strikes against the imperforate top of disk A or against the shield D and is deflected outwardly to the holes $x$ $y$, through which it passes in finely-divided condition, thus heating the surrounding atmosphere. The drum itself has its sheet-metal parts A B highly heated also, and this acts further as a heating agent.

Having described my invention, what I claim, and desire to secure by Letters Patent, is—

As a new article of manufacture, the herein-described heating attachment for Argand and other lamp or gas burners, consisting of the two dished disks A B, united at their edges to form a shallow drum having an imperforate bottom, except for a central chimney-receiving opening, and a top imperforate in the center and perforated near its rim, the collar $b$, surrounding the chimney-opening, and the spring hooks or clasps $c$, as hereinbefore shown and described.

In testimony whereof I affix my signature in presence of two witnesses.

RUFUS S. MERRILL.

Witnesses:
EWELL A. DICK,
L. C. HILLS.